J. CROOKES.
Saws.

No. 141,122. Patented July 22, 1873.

ATTEST:
Walter Allen
Robert Burns

INVENTOR:
Joseph Crookes.
By Knight Bros
Attys.

UNITED STATES PATENT OFFICE.

JOSEPH CROOKES, OF ST. LOUIS, MISSOURI, ASSIGNOR OF ONE-HALF HIS RIGHT TO JOSEPH W. BRANCH, OF SAME PLACE.

IMPROVEMENT IN SAWS.

Specification forming part of Letters Patent No. 141,122, dated July 22, 1873; application filed June 17, 1873.

*To all whom it may concern:*

Be it known that I, JOSEPH CROOKES, of St. Louis, St. Louis county, Missouri, have invented an Improvement in Saws, of which the following is a specification:

My improvement consists in a spring-clamp inserted in the saw-plate, and removable therefrom, and whose jaws are so arranged as to firmly hold the diamond set when pinched together by an eccentrically-grooved cam, which also serves to hold the clamp in place in the plate; the cam occupying a circular hole which is partly formed in the saw-plate, and partly in one jaw of the clamp.

Figure 1:
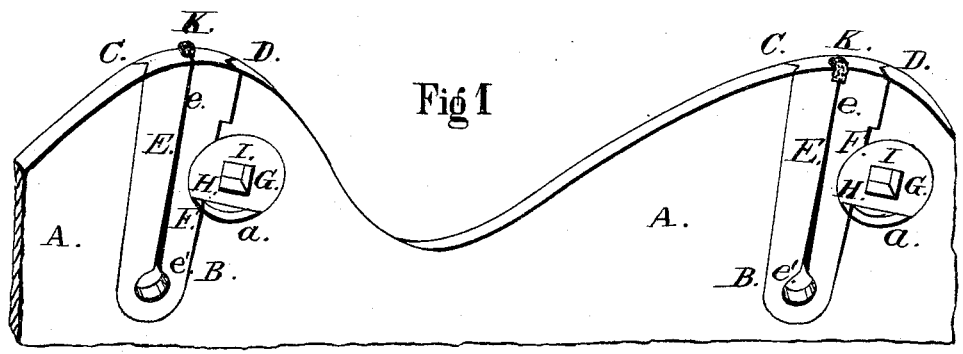
Figure 2:
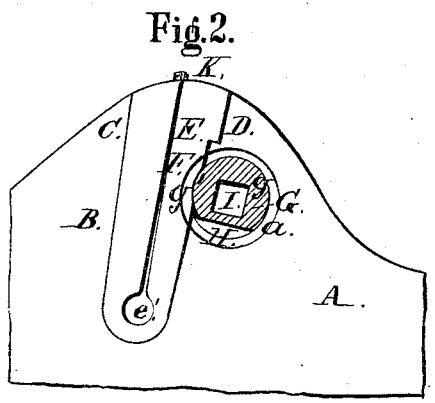
Figure 3:
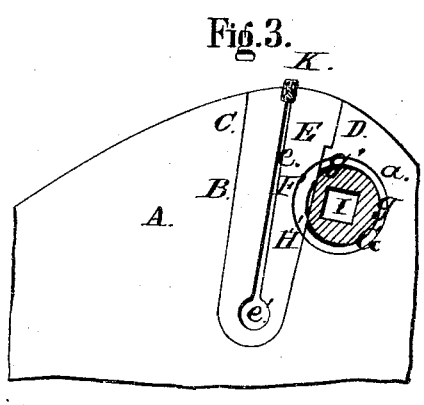
Figure 4:
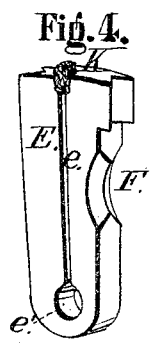

Figure 1 is a perspective view of my improvement, showing two teeth in which the diamonds are set in opposite sides. Figs. 2 and 3 are side views, showing the cam in section. In Fig. 2 the cam is shown turned so as to hold the clamp in position in the plate, and also to force the jaws of the clamp together upon the diamonds. In Fig. 3 the cam is shown with the flat side toward the clamp so as to allow the removal of the diamond from the clamp or the clamp from the saw-plate. Fig. 4 is a perspective view of the clamp with the diamond in position.

A is the saw-plate, having slots B, having beveled sides, forming an angular rib, C, at the rear edge and, D, at the front edge. The inner end of the slot is rounding. The edge of the clamp E is made to fit the edge of the slot B all around, except that at the front edge is a recess, F, to receive the edge of the cam G, when the latter is so turned as to hold the clamp in place. The angular ribs C D and the corresponding grooves in the clamp hold the latter transversely when the clamp is first inserted, but the front edge of the clamp is chiefly held by the cam when it is fixed in position. The clamp is split at $e$ to form it into two jaws, and the split ends in a circular orifice, $e'$, so that the inner end of the clamp constitutes a semicircular spring. The cam fits and turns in a circular double-countersunk cavity, partly formed in the saw-plate at $a$, and partly formed in the clamp at F. The periphery of the cam is circular at the outer sides, about two-thirds around, more or less, and upon one side is a flat spot, which, when the cam is in position to allow the insertion or removal of the tooth, as shown in Fig. 3, is straight with the side D of the slot B. The cirular part of the cam has a marginal groove, $g$, which is not circular like the outer sides, but is deepened at one side of the flat spot H, as shown at $g'$, so that, as the cam is turned into position shown in Fig. 2, it shall gradually force the split $e$ together upon the diamond and hold the clamp in place in the saw-plate. I is an angular key-hole to receive the end of a key by which the cam is turned. K is the diamond, which is set between the jaws of the clamp and held in position by the pressure of the cam upon the front jaw.

I do not claim a cutter-holder, such as described in J. E. Emerson's patent of February 6, 1872.

I claim as my invention—

The combination of spring-clamp E, eccentrically-grooved cam G, and diamond or other set or cutter K, substantially as set forth.

JOSEPH CROOKES.

Witnesses:
SAML. KNIGHT,
ANTHONY SCHULTZ.